United States Patent
Holloway et al.

(10) Patent No.: US 6,867,286 B1
(45) Date of Patent: Mar. 15, 2005

(54) YELLOW DYES AND INK COMPOSITIONS

(75) Inventors: Ann P. Holloway, Lexington, KY (US); James Frederic Feeman, Wyomissing, PA (US)

(73) Assignee: Lexmark International, Inc., Lexington, KY (US)

(*) Notice: Subject to any disclaimer, the term of this patent is extended or adjusted under 35 U.S.C. 154(b) by 0 days.

(21) Appl. No.: 10/798,679

(22) Filed: Mar. 11, 2004

Related U.S. Application Data

(63) Continuation-in-part of application No. 10/265,547, filed on Oct. 7, 2002, now abandoned.

(51) Int. Cl.[7] .................. C09B 29/36; C09B 33/12; C09D 11/02
(52) U.S. Cl. .................. 534/797; 534/803; 106/31.48
(58) Field of Search .................. 534/797, 803; 106/31.48

(56) References Cited

U.S. PATENT DOCUMENTS

| | | | |
|---|---|---|---|
| 1,667,312 A | | 4/1928 | Fritzsche et al. |
| 3,459,729 A | | 8/1969 | Crotti et al. |
| 3,565,882 A | | 2/1971 | Doss |
| 4,777,248 A | | 10/1988 | Greenwood |
| 5,268,459 A | * | 12/1993 | Gregory et al. ............. 534/758 |
| 5,496,381 A | | 3/1996 | Russ et al. |
| 5,721,344 A | * | 2/1998 | Baettig .................. 534/776 |
| 5,824,785 A | | 10/1998 | Baettig et al. |
| 6,290,763 B1 | * | 9/2001 | Millard et al. ........... 106/31.48 |
| 6,320,031 B1 | * | 11/2001 | Baettig et al. ............. 534/803 |
| 6,646,024 B2 | | 11/2003 | Beach et al. |

FOREIGN PATENT DOCUMENTS

| | | | |
|---|---|---|---|
| EP | 1031614 | * | 8/2000 |
| JP | 59-8775 | * | 1/1984 |
| WO | WO-99/64526 | * | 12/1999 |
| WO | WO-00/54807 | | 9/2000 |
| WO | WO 00/54807 | | 10/2000 |

OTHER PUBLICATIONS

Chemical Abstracts, 100:193751, 1984.*
Chemical Abstracts, 100:193,751, 1984.

* cited by examiner

*Primary Examiner*—Fiona T. Powers
(74) *Attorney, Agent, or Firm*—John A. Brady

(57) ABSTRACT

Provided are novel yellow azo dyes which are useful in ink compositions, especially ink jet compositions. The dyes and ink compositions of the present invention exhibit a good balance of optical density, print reliability, water fastness and light fashion and exhibit improved water solubility, thus rendering the ink compositions to be especially suitable for printheads having small nozzle openings.

16 Claims, No Drawings

YELLOW DYES AND INK COMPOSITIONS

CROSS REFERENCE TO RELATED APPLICATION

This is a continuation-in-part to application Ser. No. 10/265,547, filed Oct. 7, 2002 now abandoned, with the same title as this application.

FIELD OF THE INVENTION

This invention belongs to the field of organic chemistry. In particular, it relates to certain azo dyes useful in ink jet ink compositions.

BACKGROUND OF THE INVENTION

Inks used in ink jet printing systems typically are comprised of various dyes either dissolved in water or an organic solvent or mixtures thereof. There is a need for inks having higher quality images, printing speed, improved water-fastness and lightfastness.

In addition, one trend in modern ink jet printing is the use of printheads with smaller nozzle openings. The use of smaller nozzle openings thus requires higher solubility in water, so that the overall dye content in the ink composition can be increased to provide the same color strength in a smaller droplet, relative to traditional printheads and nozzle sizes.

SUMMARY OF THE INVENTION

Provided are novel azo dyes which are useful in ink compositions, especially ink jet ink compositions. The dyes and ink compositions of the present invention exhibit a good to excellent balance of optical density, color value, water-fastness and lightfastness, while at the same time exhibiting improved solubility, thus rendering such ink compositions to be especially suitable for modern printheads.

The novel azo dyes of the present invention are of the following Formula (I):

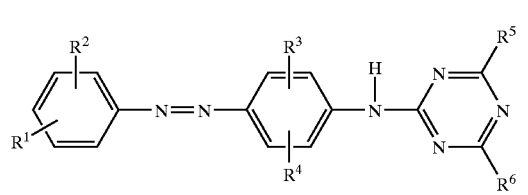

wherein $R^1$ comprises —$SO_3M$ or —$CO_2M$;
$R^2$ comprises —H, -lower alkyl, -lower alkoxy, -halogen, —NH—C(O)-lower alkyl, —$SO_3M$, or —$CO_2M$;
$R^3$ comprises —H, -lower alkyl, -lower alkoxy, —O-lower-alkylene-$CO_2M$, -lower alkylene-$CO_2M$, —NH—C(O)—$CO_2M$, —NH—C(O)-lower alkyl, or —$CO_2M$;
$R^4$ comprises —H, -lower alkyl, or -lower alkoxy;
$R^5$ comprises a group of the formula:

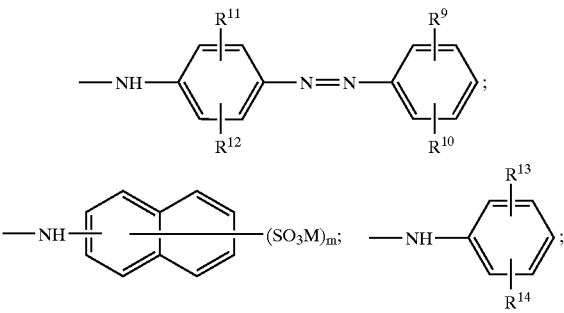

—NH-lower alkylene-$SO_3M$;
—NH-lower alkylene-($CO_2M$);
—S-lower alkylene-$SO_3M$; or
—S-lower alkylene-($CO_2M)_m$;
wherein
$R^9$ and $R^{13}$ comprise, independently, —$SO_3M$ or —$CO_2M$;
$R^{10}$ and $R^{14}$ comprise, independently, —H, -lower alkyl, -lower alkoxy, -halogen, —NH—C(O)-lower alkyl, —$SO_3M$, or —$CO_2M$;
$R^{11}$ comprises —H, -lower alkyl, -lower alkoxy, —O-lower-alkylene-$CO_2M$, -lower alkylene-$CO_2M$, —NH—C(O)—$CO_2M$, —NH—C(O)-lower alkyl, or —$CO_2M$;
$R^{12}$ comprises —H, -lower alkyl, or -lower alkoxy;
$R^6$ comprises a group of the formula:

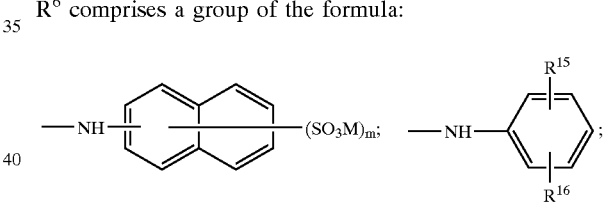

—NH-lower alkylene-$SO_3M$;
—NH-lower alkylene-($CO_2M)_m$;
—S-lower alkylene-$SO_2M$;
—S-lower alkylene-($CO_2M)_m$; or
—NH—$R^{17}$,
wherein
$R^{15}$ comprises —$SO_3M$ or —$CO_2M$;
$R^{16}$ comprises —H, -lower alkyl, -lower alkoxy, -halogen, —NH—C(O)-lower alkyl, —$SO_3M$, or —$CO_2M$;
$R^{17}$ comprises —H, -lower alkyl, or —$CH_2CH_2CHR^{18}$—O)—H,
$R^{18}$ comprises —H, —$CH_3$, —$CH_2CH_3$, or —$CH_2OH$, m is 1 or 2;
M comprises —H, —Li, —Na, —K, —$N(R^{19})_4$, or —$HN(R^{19})_3$,
wherein
$R^{19}$ comprises —H, -lower alkyl, or —($CH_2CHR^{20}$—O)—H,
$R^{20}$ comprises —H, —$CH_3$, —$CH_2CH_3$, or —$CH_2OH$.

The present invention also provides ink compositions comprising the dye of Formula (I), water, and a co-solvent.

DETAILED DESCRIPTION OF THE INVENTION

In a first embodiment, the present invention provides a compound of Formula (I):

(I)

wherein
$R^1$ comprises —$SO_3M$ or —$CO_2M$;
$R^2$ comprises —H, -lower alkyl, -lower alkoxy, -halogen, —NH—C(O)-lower alkyl, —$SO_3M$, or —$CO_2M$;
$R^3$ comprises —H, -lower alkyl, -lower alkoxy, —O-tower-alkylene-$CO_2M$, -lower alkylene-$CO_2M$, —NH—C(O)—$CO_2M$, —NH—C(O)-lower alkyl, or —$CO_2M$;
$R^4$ comprises —H, -lower alkyl, or -lower alkoxy;
$R^5$ comprises a group of the formula —NH-lower alkylene-$SO_3M$;
—NH-lower alkylene-$(CO_2M)_m$;
—S-lower alkylene-$SO_3M$; or
—S-lower alkylene-$(CO_2M)_m$;
  wherein
  $R^9$ and $R^{13}$ comprise, independently, —$SO_3M$ or —$CO_2M$;
  $R^{10}$ and $R^{14}$ comprise, independently, —H, -lower alkyl, -lower alkoxy, -halogen, —NH—C(O)-lower alkyl, —$SO_3M$, or —$CO_2M$;
  $R^{11}$ comprises —H, -lower alkyl, -lower alkoxy, —O-lower-alkylene-$CO_2M$, -lower alkylene-$CO_2M$, —NH—C(O)—$CO_2M$, —NH—C(O)-lower alkyl, or —$CO_2M$;
  $R^{12}$ comprises —H, -lower alkyl, or -lower alkoxy;

$R^6$ comprises a group of the formula

—NH-lower alkylene-$SO_3M$;
—NH-lower alkylene-$(CO_2M)_m$;
—S-lower alkylene-$SO_3M$;
—S-lower alkylene-$(CO_2M)_m$; or
—NH—$R^{17}$,
  wherein
  $R^{15}$ comprises —$SO_3M$ or —$CO_2M$;
  $R^{16}$ comprises —H, -lower alkyl, -lower alkoxy, -halogen, —NH—C(O)-lower alkyl, —$SO_3M$, or —$CO_2M$;
  $R^{17}$ comprises —H, -lower alkyl, or —$(CH_2CHR^8$—O)—H,
  $R^{18}$ comprises —H, —$CH_3$, —$CH_2CH_3$, or —$CH_2OH$,
  m is 1 or 2;
  M comprises —H, —Li, —Na, —K, —$N(R^{19})_4$, or —$HN(R^{19})_3$,
  wherein
  $R^{19}$ comprises —H, -lower alkyl, or —$(CH_2CHR^{20}$—O)—H,
  $R^{20}$ comprises-H, —$CH_3$, —$CH_2CH_3$, or —$CH_2OH$.

In a preferred embodiment, the present invention provides a compound of Formula (II):

(II)

wherein:
$R^3$ comprises a/lower alkoxy group; and
$R^5$ and $R^6$ are as defined above for Formula (1).
M comprises —H, —Li, —Na, —K, —$N(R^{19})_4$, or —HN$(R^9)_3$,
wherein
$R^{19}$ comprises —H, -lower alkyl, or —$(CH_2CHR^{20}$—O)—H,
$R^{20}$ comprises —H, —$CH_3$, —$CH_2CH_3$, or —$CH_2OH$.

Especially preferred dyes of the present invention include dyes of the Formula (III), (IV), and (V):

(III)

This invention also encompasses the following variations of the foregoing dye (IIIA).

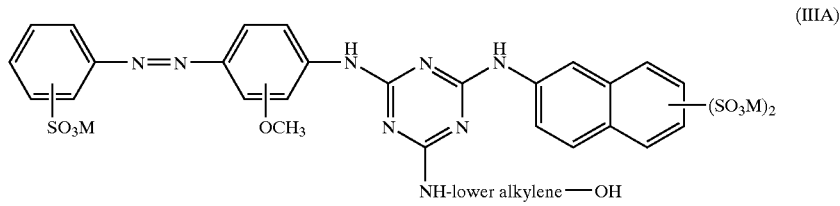

(IIIA)

wherein M comprises —H, —Li, —Na, —K, —N(R¹)₄, or —HN(R¹)₃, wherein R¹ comprises —H, -lower alkyl, or —(CH₂CHR²—O)—H, and R² comprises —H, —CH₃, —CH₂CH₃, or —CH₂OH.

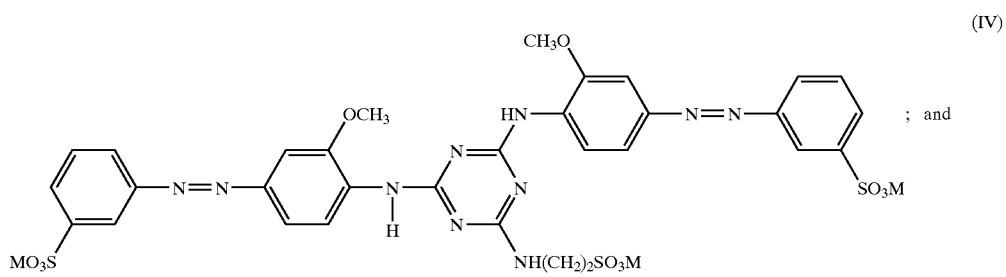

(IV)

; and

This invention also encompasses the following variations of the foregoing dye (IVA).

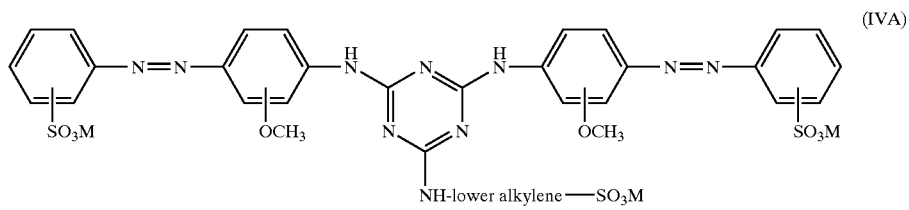

(IVA)

wherein M comprises —H, —Li, —Na, —K, —N(R¹)₄, or —HN(R¹)₃, wherein R¹ comprises —H, -lower alkyl, or —(CH₂CHR²—O)—H, and R² comprises —H, —CH₃, —CH₂CH₃, or —CH₂OH.

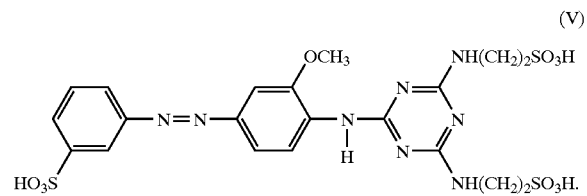

(V)

The azo dyes of the present invention are useful as dyes, especially as dyes in ink jet ink compositions. The azo dyes of the present invention have improved solubility which results in improved ink jet printhead reliability, especially when utilized with smaller diameter nozzles, while maintaining a good to excellent balance of optical density, color value, waterfastness and lightfastness. A further aspect of the present invention provides an ink composition comprising.

(a) at least 0.1% by weight of a compound of Formula (1):

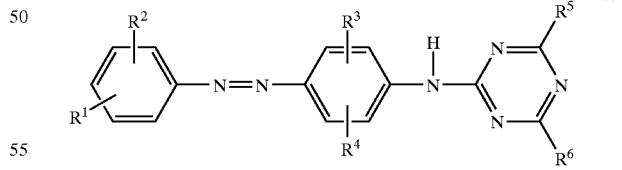

(I)

wherein $R^1$ comprises —SO₃M or —CO₂M;

$R^2$ comprises —H, -lower alkyl, -lower alkoxy, -halogen, —NH—C(O)-lower alkyl, —SO₃M, or —CO₂M;

$R^3$ comprises —H, -lower alkyl, -lower alkoxy, —O-lower-alkylene-CO₂M, -lower alkylene-CO₂M, —NH—C(O)—CO₂M, —NH—C(O)-lower alkyl, or —CO₂M;

$R^4$ comprises —H, -lower alkyl, or -lower alkoxy;

$R^5$ comprises a group of the formula

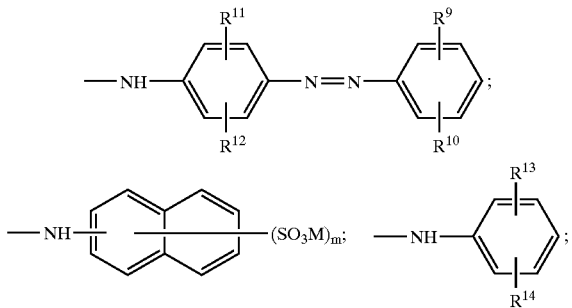

—NH-lower alkylene-$SO_3M$;
—NH-lower alkylene-$(CO_2M)_m$;
—S-lower alkylene-$SO_3M$; or
—S-lower alkylene-$(CO_2M)_m$;
wherein
$R^9$ and $R^{13}$ comprise, independently, —$SO_3M$ or —$CO_2M$;
$R^{10}$ and $R^{14}$ comprise, independently, —H, -lower alkyl, -lower alkoxy, -halogen, —NH—C(O)-lower alkyl, —$SO_3M$, or —$CO_2M$;
$R^{11}$ comprises —H, -lower alkyl, -lower alkoxy, —O-lower-alkylene-$CO_2M$, -lower alkylene-$CO_2M$, —NH—C(O)—$CO_2M$, —NH—C(O)-lower alkyl, or —$CO_2M$;
$R^{12}$ comprises —H, -lower alkyl, or -lower alkoxy;
$R^6$ comprises a group of the formula

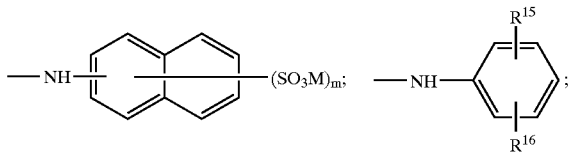

—NH-lower alkylene-$SO_3M$;
—NH-lower alkylene-$(CO_2M)_m$;
—S-lower alkylene-$SO_3M$;
—S-lower alkylene-$(CO_2M)_m$; or
—NH—$R^{17}$,
wherein
$R^{15}$ comprises —$SO_3M$ or —$CO_2M$;
$R^{16}$ comprises —H, -lower alkyl, -lower alkoxy, -halogen, —NH—C(O)-lower alkyl, —$SO_3M$, or —$CO_2M$;
$R^{17}$ comprises —H, -lower alkyl, or —$(CH_2CHR^{18}$—O)—H,
$R^{18}$ comprises —H, —$CH_3$, —$CH_2CH_3$, or —$CH_2OH$,
m is 1 or 2;
M comprises —H, —Li, —Na, —K, —$N(R^{19})_4$, or —HN$(R^{19})_3$,
wherein
$R^{19}$ comprises —H, -lower alkyl, or —$(CH_2CHR^{20}$—O)H,
$R^{20}$ comprises —H, —$CH_3$, —$CH_2CH_3$, or —$CH_2OH$.
(b) water, and
(c) at least one co-solvent.

In the above formulae, and hereafter the term "lower alkyl" refers to a straight or branched-chain $C_1$–$C_4$ alkyl group. Examples include methyl, ethyl, propyl, isopropyl, n-butyl, t-butyl, and isobutyl.

The term "lower alkoxy" refers to a $C_1$–$C_4$ alkoxy group. Examples include methoxy, ethoxy, propoxy, and butoxy.

Likewise, the terms "lower hydroxyalkyl" and "lower cyanoalkyl" preferably refer to $C_1$–$C_4$ alkyl groups substituted by at least one hydroxy or cyano group, respectively.

The term "lower alkylene" refers to a divalent group of the formula —$(CH_2)$-m wherein m is an integer of from 1 to 4. Examples include methylene, ethylene, propylene, and butylene.

The compounds of this invention may be prepared by diazotizing, for example, an optionally and appropriately substituted aminobenzene sulfonic acid, aminobenzoic acid, or aminophthalic acid, coupling with aniline, or an appropriately substituted aniline such as, for example, ortho- or meta-toluidine, ortho- or meta-anisidine, ortho- or meta-phenetidine, cresidine, dimethoxyaniline, diethoxyaniline, an appropriately substituted 3-aminophenoxyacetic acid, propionic, or butyric acid or an appropriately substituted 3'-aminophenylacetic, propionic or butyric acid, reacting the resultant aminoazobenzene intermediate compound in equimolar quantity with cyanuric chloride, then optionally reacting the product with a second molar equivalent of the same or a different aminoazobenzene intermediate compound, or with a suitable aminoalkylenesulfonic acid, an aminoalkylene-mono or dicarboxylic acid, an aminobenzene mono or di-carboxylic acid, an aniline-mono- or disulfonic acid, an amino-naphthalene mono- or di-sulfonic acid, a mercaptoacetic, propionic, or succinic acid, or a mercaptoalkylenesulfonic acid, and finally reacting this product with an equimolar quantity of ammonia, a primary aliphatic or alkanolamine, an aminoalkylenesulfonic acid, an aminoalkylene mono-or di-carboxylic acid, an, aminobenzene mono-or dicarboxylic acid, an aminobenzene mono or disulfonic acid, an aminonaphthalene mono or disulfonic acid, a mercaptoalkylene sulfonic acid or a mercaptoalkylene mono- or dicarboxylic acid, the final dye structure containing at least three sulfonic acid groups or an equally water-solubilizing combination of carboxylic and sulfonic acid groups, such as two or three carboxylic acid groups with two sulfonic acid groups, or three to four carboxylic acid groups with one sulfonic acid group.

Examples of compounds from which the diazonium component may be derived include: metanilic acid, sulfanilic acid, anisidine sulfonic acids, phenetidine sulfonic acids, toluidine sulfonic acids, 4- or 6-chlorometanilic acid, anthanilic sulfonic acids, 2, 3 or 4-aminobenzoic acid, 3- or 4-aminophthalic acid, 4- or 5-aminoisophthalic acid, 2-amino-3-methoxybenzoic acid, 4-amino-3-methylbenzoic acid.

Suitable couplers include, for example, aniline, o- or m-toluidine, o- or m-anisidine, o- or m-phenitidine, m-aminoacetanilide, m-aminoacetanilide sulfonic acid, an ortho or meta-amino phenylacetic, -propionic or -butyric acid, an ortho or meta-aminophenoxyacetic, propionic or -butyric acid, 2,5-dimethoxyaniline, 2,5-diethoxyaniline, cresidine, and anthranilic acid.

Examples of intermediates suitable for the second and third reactions with the cyanuric chloride to produce $R^5$ and $R^6$, in addition to a substituted aminobenzene compound for $R^5$ include, for example, taurine, 3-aminopropanesulfonic acid, orthanilic acid, metanilic acid, sulfanilic acid, 2, 3, or 4-aminobenzoic acid, 3 or 4-aminophthalic acid, 4 or 5-aminoisophthalic acid, an anisidinesulfonic acid, a toluidine sulfonic acid, 4- or 6-chlorometanilic acid, 4-amino-3-methoxybenzoic acid, phenetidine sulfonic acids, m-aminoacetanilide sulfonic acid, aniline disulfonic acid, Amino G acid, Amino J acid, Amino R acid, napthionic acid, Broenner's acid, Laurent's acid, C acid, epsilon acid, Cleve's acid, 2-mercaptoethanesulfonic acid, 3-mercapto-1-propanesulfonic acid, 3-aminoadipic acid, mercaptosuccinic acid, thiolactic acid, mercaptoacetic acid, 2, 3, or 4-aminobutyric acid, 3-aminoisobutyric acid, 5-aminovaleric acid, ethanolamine, ammonia, methyl amine, ethyl amine, propyl amine, 3-aminopropanol, and 2-(2'-aminoethoxy)-ethanol.

A salt form of the dyes of the present invention may be obtained by employing throughout the synthesis the corresponding hydroxide, carbonate, or bicarbonate of an alkali metal, or by using throughout the synthesis a non-reactive tertiary amine or quaternary ammonium hydroxide, such as triethanolamine, trimethyl amine, triethyl amine or tetramethyl or tetraethyl ammonium hydroxide. In addition, a salt form may be conveniently converted to a different salt form, or the free acid, by ion exchange, using well-known equipment and procedures. Purification to remove impurities and salts may be accomplished by reverse osmosis, using readily available equipment following usual procedures. The dye concentration may be adjusted by either evaporation or dilution to the desired percentage.

The present invention relates also to ink compositions, for example aqueous ink compositions. An aqueous ink composition according to the present invention comprises a dye of formula (1), water, and, optionally, at least one co-solvent.

In Table 1, there are listed representative examples of the water-soluble dyes having the above formula (I) for use in inks in the present invention.

The inks preferably have a total content of dyes of from 0.5 to 30% by weight, preferably from 1 to 30% by weight and more preferably from 1 to 15% by weight, based on the total weight of the ink. As a lower limit, a limit of 1% by weight, preferably 2% by weight and most preferably 3% by weight, is preferred.

Humectant

In one embodiment of the present invention, the ink composition may optionally comprise a humectant acting as a co-solvent. Selection of a suitable humectant depends on the requirements of the specific application involved, such as desired surface tension and viscosity, the desired drying time of the ink, and the type of paper onto which the ink will be printed. Representative examples of humectants that may be selected include (I) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols, such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, propylene glycol, tetraethylene glycol, polyethylene glycol, glycerol, 2-methyl-2,4-pentanediol, 1,2,6-hexanetriol and thiodiglycol; (6) lower alkyl mono- or di-ethers derived from alkylene glycols, such as ethylene glycol monomethyl (or monoethyl) ether, diethylene glycol monomethyl (or monoethyl) ether, propylene glycol monomethyl (or monoethyl) ether, triethylene glycol monomethyl (or monoethyl) ether and diethylene glycol dimethyl (or diethyl) ether; (7) nitrogen-containing cyclic compounds, such as pyrrolidone, N-methyl-2-pyrrolidone, and 1,3-dimethyl-2-imidazolidinone; and (8) sulfur-containing compounds, such as dimethyl sulfoxide and tetramethylene sulfone. Other useful organic solvents include lactones and lactams. Mixtures of these solvents may be used in the present invention.

Of the above mentioned humectants, preferred humectants include; diethylene glycol, polyethylene glycol (200 to 600), ethylene glycol, triethylene glycol, tetraethylene glycol, glycerin and N-methyl-2-pyrrolidone, by which the solubility of the employed dye in the solvent of the ink composition can be increased and the evaporation of water from the ink composition can be appropriately controlled, so that the initial properties of the ink composition can be maintained even for an extended period of continuous use or storage, or during the periods when the apparatus is not in use, whereby reliable ink droplet stability and ink droplet ejection response of the ink composition, particularly after a prolonged period of non-use of the apparatus, are obtained. The amount of humectant is determined by the desired properties of the ink and may range from about 0.1% to about 30% by weight of the ink composition.

Pigments

The ink composition may also optionally comprise colorants. Colorants useful in the present invention include pigments, self-dispersed pigment blends, polymeric pigment dispersions, pigment-dye blends, and combinations thereof. The pigment can be a polymeric pigment concentrate or self-dispersed pigment concentrate, or a combination of both.

As is known in the art, a pigment dispersion is a mixture of a pigment and a dispersing agent, typically a polymeric dispersant compound. A wide variety of organic and inorganic pigments, alone or in combination, may be selected for use in the aqueous inks of the present invention. The key selection criterion for the pigment is that they must be dispersible in the aqueous medium. The term "pigment," as used herein, means an insoluble colorant. The selected pigment may be used in dry or wet form.

Suitable pigments include organic and inorganic pigments, and essentially any of the classes of pigments heretofore used in this art, of a particle size sufficient to permit free flow of the ink through the ink jet printing device, especially at the ejecting nozzles that usually have a diameter ranging from about 10 microns to about 50 microns. Thus, a suitable pigment particle size ranges from about 0.02 to about 15, preferably from about 0.02 to about 5, and more preferably from about 0.02 to about 1, micron(s) so that when jetted, the pigment particle size ranges from about 0.005 to about 0.02 microns. Pigments suitable for use in the present invention include azo pigments, such as azo lakes, insoluble azo pigments, condensed azo pigments and chelate azo pigments, polycyclic pigments, perylene pigments, anthraquinone pigments, quinacridone pigments, dioxazine pigments, thioindigo pigments, isoindolinone pigments, quinophthalone pigments, and dry lakes. Suitable organic pigments include nitro pigments, aniline black and daylight fluorescent pigments.

Preferred pigments include carbon black, Pigment Red 122, Pigment Red 202, Pigment Yellow 74, Pigment Yellow 128, Pigment Yellow 138, Pigment Yellow 155, Pigment Blue 15:3 and Pigment Blue 15:4.

Dispersant

Dispersants may optionally be used in the present invention, for example, when a insoluble pigment is used. Appropriate dispersants include those known in the art, such as the acrylic terpolymers taught in commonly-assigned U.S. Pat. No. 5,719,204, and other commonly known dispersants. Factors to be considered in selecting an appropriate dispersant include the following: First, the dispersant must firmly anchor to the pigment particle surface to withstand shear force and the competition of other chemical species. To ensure this anchoring, a careful match of the polarity of the pigment particle surface and the hydrophobic group in the dispersant is required. Second, the physical dimensions of the hydrophobic group in the dispersant must be adequate to fully cover the pigment surface, otherwise, the adsorbed polymer will act as a flocculent. Third, an electrostatic layer of a requisite thickness around the particle is needed to prevent aggregation of particles within the aqueous medium.

The pigment to dispersant (weight) ratio is preferably from about 3:1 to about 5:1, but may vary from about 1:1 to about 9:1.

Binder

A binder may also optionally be used in the ink composition of the present invention to bridge the pigment particles within the ink and aid in their adhesion to the print medium. The use of a binder allows for greater ink durability and increased image permanence. High TG binders are generally preferred for long term jetting requirements, but low TG binders are preferable for smear permanence. Also preferred are unimodal random (not block) polymer binders. Binder may be present in amounts from 0–100 parts to 100 parts of pigment, preferably 5–30 parts to 100 parts pigment.

Preferred binders for use in the present invention comprise a polymer or copolymer formed from monomer classes, including, but not limited to: acrylate esters, methacrylate esters, styrenes, substituted styrenes, vinyl acrylates, vinyl acetates, fluoromethacrylates, acrylamides, substituted acrylamides, methacrylamides, substituted methacrylamides, and combinations thereof. Among the esters of acrylic acid and methacrylic acid, preferred monomers include methyl acrylate, ethyl acrylate, propyl acrylate, butyl acrylate, lauryl acrylate, methyl methacrylate, ethyl methacrylate, propyl methacrylate, butyl methacrylate, lauryl methacrylate, and isobutylene methacrylate.

In one embodiment, the binder may comprise a copolymer of butyl acrylate and methyl methacrylate. In a further embodiment, the polymeric binder may comprise a copolymer ranging from about 20% to about 40% by weight of methyl methacrylate and about 60% to about 80% by weight of butyl acrylate. The polymeric binder may comprise a copolymer ranging from about 27% to about 33% by weight of methyl methacrylate and about 66% to about 72% by weight of butyl acrylate. In another embodiment, the polymeric binder comprises 10% to 50% by weight methyl methacrylate, 50% to 85% by weight butyl acrylate, and 3% to 10% by weight methacrylic acid, based on the total weight of the polymeric binder; for example 14.5% by weight methyl methacrylate, 80.5% by weight butyl acrylate, and 5% by weight methacrylic acid. The foregoing merely represent example of suitable polymeric binder compositions.

The polymeric binder may further comprise an acid component. The acid component may comprise acrylic acid, methacrylic acid, itaconic acid, vinyl sulfonic acid, maleic acids or combinations thereof, or may be derived from salts or anhydrides of such acids, such as methacrylic or maleic anhydride or sodium vinylsulfonate or acrylomidopropane sulfonate. In one embodiment the acid component is methacrylic acid. In another embodiment, the acid component is methacrylic acid in combination with another acid. The acid component of the polymeric binder ranges from about 1% to about 10% by weight of the total weight of the polymeric binder. In one embodiment, when the acid component is methacrylic acid, the acid component is about 1.1% to about 1.5% by weight of the total weight of the polymeric binder. In another embodiment, when the acid component is methacrylic acid, the acid component is about 1.3% by weight of the total weight of the polymeric binder.

It should be noted, however, that the examples of ink compositions discussed herein do not represent the only possible formulations encompassed by the present invention, and that the present invention includes ink compositions when the acid component of the polymeric binder ranges from about 1% to about 10% by weight of the total weight of the polymeric binder.

The most preferred binder in the present invention may comprise from about 0% to about 5% by weight in the ink composition, a unimodal acrylic emulsion which contains a random copolymer comprised of butylmethacrylate and methylmethacrylate monomers as described in co-pending U.S. Pat. No. 6,646,024 B2 of Beach et al. assigned to Lexmark International, Inc. the same assignee here.

Penetrant

A penetrant may also optionally be used in the ink composition of the present invention to improve penetration by the ink drops into the surface of the printed substrate and to reduce or eliminate intercolor bleeding (i.e., lateral bleeding of color). Penetrants (which include surfactants) are preferred for use in the invention. Preferred penetrants for use in the present invention include 1,2 alkyl diols containing from about 4 to about 10 carbon atoms in the alkyl group such as those taught in commonly-assigned U.S. Pat. No. 5,364,461. Most preferred are 1,2-hexanediol and hexyl carbitol. In a preferred embodiment, the penetrant is present in the ink composition in an amount of from between about 0.01% to about 10% by weight, preferably 0.1% to about 3%.

Surfactant

The ink compositions may also optionally comprise surfactants to modify the surface tension of the ink and to control the penetration of the ink into the paper. Suitable surfactants include nonionic, amphoteric, cationic, and anionic surfactants. Preferred surfactants include alkyl sulfate, nonyl phenyl polyethylene glycol, the SILWET® series of surfactants (OSI Sealants, Inc.), the TERGITOL® series of surfactants (Union Carbide) and the SURFYNOL® series of surfactants (Air Products and Chemicals, Inc.).

Biocide

The ink compositions may also optionally comprise additives that inhibit the growth of fungi and/or bacteria (biocides). Such additives are usually used in amounts of from 0.01 to 1.0% by weight, based on the total weight of the ink. Sodium dehydroacetate, sodium sorbate, 2-pyridine thiol-1-oxide sodium salt, sodium benzoate and sodium pentachlorophenol can be employed as biocides. A preferred biocide is 1,2-benzisothiazolin-3-one, commercially available as Proxel® GXL manufactured by Zeneca.

Buffer

Any known pH adjustment agents may optionally be used in the present invention, so long as they do not have an adverse effect on the ink composition and can control the pH of the ink composition.

Buffering agents, such as borax, borates, phosphates, polyphosphates or citrates (for example, sodium borate, sodium tetraborate, sodium phosphate, sodium dihydrogen phosphate, disodium hydrogen phosphate, sodium tripolyphosphate, sodium pentapolyphosphate and sodium citrate) may also be added to adjust or maintain a desired pH for the ink. A preferred buffer is potassium hydroxide, sodium phosphate or sodium borate. As will be appreciated, the amount of buffer will depend on the other components in the ink. However, it has been found that the addition of small amounts of buffer to the ink, such as from about 0.01% to about 0.3% by weight, preferably from 0.1 to 1% by weight, is useful.

Chelating Agent

The ink compositions may also optionally comprise chelating agents. Chelating agents, such as for example, ethylene diamine tetraacetate (EDTA), trisodium nitrilotriacetate, hydroxyethyl ethylenediamine trisodium acetate, diethylene triamino pentasodium acetate and uramil disodium acetate, may be added to prevent any deleterious effects from metal or alkali metal ion contaminants or impurities. Typically, a chelating agent may be added to the composition in an amount of from about 0.1% to about 1.0% by weight. A preferred chelating agent is EDTA.

Other additives, for example, ultra-violet-ray-absorbing agents, infrared-ray-absorbing agents, polymeric compounds, and solubility increasing agents for increasing the solubility of the dye dissolved in the solvent of the ink composition can be employed as thought necessary in specific embodiments of an aqueous ink composition for ink-jet recording according to the present invention.

EXAMPLES

Preferred embodiments of an aqueous ink composition for ink-jet recording according to the present invention will now be explained by referring to the following examples.

The following Examples serve to illustrate the invention. Unless otherwise indicated, parts are parts by weight and percentages relate to percent by weight. The relationship between parts by weight and parts by volume is the same as that between kilograms and liters.

Example 1

A dye of Formula (IV) can be prepared according to the following procedure.

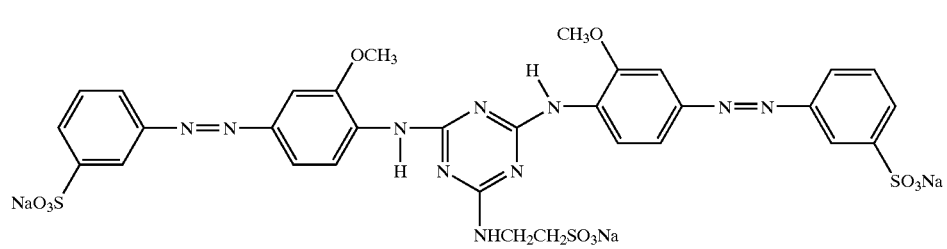

(IV)

A solution was prepared of 61.4 g of 4-amino-3-methoxyazobenzene-3'-sulfonic acid (prepared in conventional manner) in 300 mL of water containing 8 g of sodium hydroxide. When the solution was complete, it was diluted to 400 mL with water.

A 2 liter beaker containing 200 mL water and 200 g ice was placed in an ice/water bath. 18.4 g of finely ground cyanuric chloride was added to the beaker. With vigorous agitation, half of the amino-azobenzene derivative solution was added dropwise over 25 minutes. The temperature of the reaction was held at 0° C. by further addition of ice as required. When all of the solution was in, the pH of the mixture was slowly raised to about 6.2 by sifting in 8.4 g of sodium bicarbonate slowly over 15 minutes. After stirring further for about 15 minutes the red-brown slurry had changed to bright yellow and a thin-layer chromatogram showed completion of the reaction. The pH was also stable at 6.2.

The second half of the amino-azobenzene derivative solution was then dropped in over 30 minutes. The ice/water bath was removed and the reaction temperature was allowed to rise to ambient, about 20° C. After stirring for 15 minutes more an additional 8.4 g of sodium bicarbonate was sifted into the reaction slurry over 15 minutes. The pH rose to 7.5 and the reaction was a clear yellow solution at 1100 mL volume. The reaction was stirred for an additional 16 hours at about 20° C.

Next, 25 g Taurine (2-aminoethanesulfonic acid) was added. The pH was raised to 9 by addition of sodium hydroxide solution. The solution was heated to 80–85° C. and held at this temperature and at pH 8.5 to 9 for at least four hours. The resultant bright yellow dye was highly soluble in water over a wide pH range and had very good lightfastness when used for ink jet printing on plain and special papers.

The dye solution was subjected to reverse osmosis to remove excess taurine, impurities and salts. Conversion to other salt forms was accomplished by means of ion exchange according to well-known procedures.

Example 2

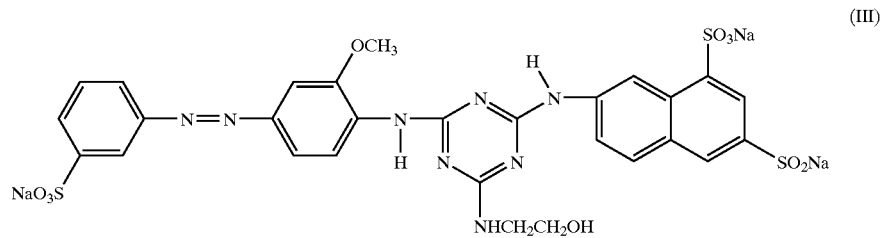

(III)

The general method of Example 1 was repeated except that the second half of the aminoazobenzene derivative solution was replaced by an equimolar amount of Amino G acid (2-naphthylamine-6,8-disulfonic acid) in solution, and the taurine was replaced by 12.2 g of ethanolamine as the third reactant. A highly water-soluble yellow dye of Formula (III) was obtained. This dye also exhibited very good lightfastness when used in inks for ink jet printing on plain and special papers.

Example 3

A dye of Formula (V) can be prepared according to the following procedure.

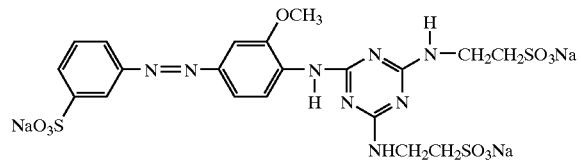

(V)

The general method of Example 1 was repeated except that the second half of the aminoazobenzene derivative solution was replaced with 12.5 g taurine. The product was a solution of a highly water-soluble bright yellow dye, having very good lightfastness on plain or special papers when applied in inks by ink jet printing.

Further examples of especially preferred embodiments of the present invention include the following wherein $R^1$, $R^2$, $R^3$, $R^4$, $R^5$, $R^6$ and M of Formula (1) are as set fourth below in Table 1:

TABLE 1

| Ex. | $R^1$ | $R^2$ | $R^3$ | $R^4$ | $R^5$ | $R^6$ | M |
|---|---|---|---|---|---|---|---|
| 4 | 3-$SO_3$M | H | 2-$OCH_3$ | H | —NH—C6H3(3-OCH3)—N=N—C6H4-3-$SO_3$M | —S—$CH_2CH_2$—$SO_3$M | Na |
| 5 | 3-$SO_3$M | H | 2-$OCH_3$ | H | —NH—C6H3(3-OCH3)—N=N—C6H4-3-$SO_3$M | —S—$CH_2CH_2CH_2SO_3$M | Na |
| 6 | 3-$SO_3$M | H | 3-$CH_3$ | H | —NH—C6H3(2-CH3)—N=N—C6H4-3-$SO_3$M | —NH$CH_2CH_2SO_3$M | Na |
| 7 | 3-$SO_3$M | H | 2-$OCH_3$ | H | —NH—C6H3(2-CH3)—N=N—C6H4-4-$SO_3$M | —NH$CH_2CH_2SO_3$M | Li |
| 8 | 3-$SO_3$M | H | 2-$OCH_3$ | H | —NH—C6H3(3-OCH3)—N=N—C6H4-3-$SO_3$M | —NH$CH_2CH_2CH_2SO_3$M | K |
| 9 | 4-$SO_3$M | H | 3-$CH_3$ | H | —NH—C6H3(2-CH3)—N=N—C6H4-4-$SO_3$M | —S—$CH_2CH_2$—$SO_3$M | Na |
| 10 | 4-$SO_3$M | H | H | H | —NH—C6H4—N=N—C6H4-4-$SO_3$M | —NH—$CH_2CH_2$—$SO_3$M | Na |
| 11 | 4-$SO_3$M | H | 2-$CH_3$ | H | —NH—C6H3(3-CH3)—N=N—C6H4-4-$SO_3$M | —NH—$CH_2CH_2$—$SO_3$M | Na |
| 12 | 4-$SO_3$M | H | 3-$CH_3$ | H | —NH—C6H3(2-CH3)—N=N—C6H4-4-$SO_3$M | —NH—$CH_2CH_2$—$SO_3$M | Na |

TABLE 1-continued
| Ex. | R¹ | R² | R³ | R⁴ | R⁵ | R⁶ | M |
|---|---|---|---|---|---|---|---|
| 13 | 5-SO₃M | 2-Cl | 2-OCH₃ | H | 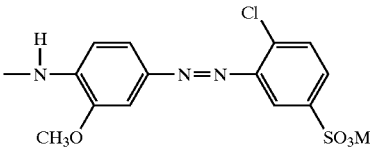 | —NH—CH₂CH₂—SO₃M | Na |
| 14 | 5-SO₃M | 2-OCH₃ | 3-CH₃ | H | 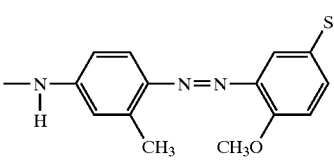 | —NH—CH₂CH₂—SO₃M | HN(CH₂CH₂OH)₃ |
| 15 | 3-SO₃M | H | 2-OCH₃ | H | 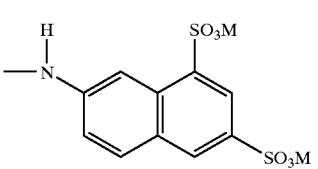 | —NH₂ | Na |
| 16 | 3-SO₃M | H | 2-OCH₃ | H | 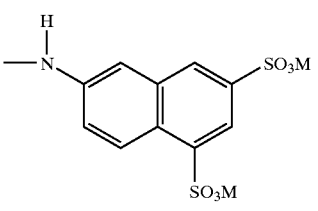 | —NH—CH₂—CH₂—OH | Na |
| 17 | 3-SO₃M | H | 2-OCH₃ | H | 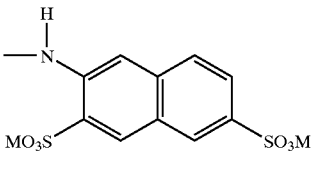 | —NH—CH₂CH₂—SO₃M | Na |
| 18 | 3-SO₃M | H | 2-OCH₃ | H | 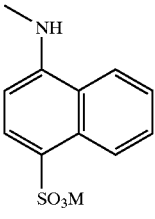 | —NH—CH₂CH₂—SO₃M | Li |
| 19 | 3-SO₃M | H | 2-OCH₃ | H | 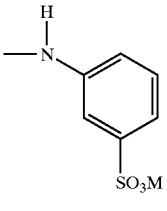 | —NH—CH₂CH₂—SO₃M | Na |
| 20 | 3-SO₃M | H | 2-OCH₃ | H | 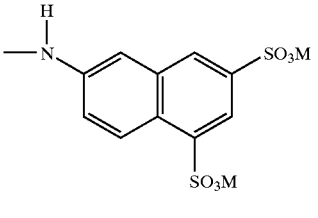 | —NH—CH₃ | Na |

TABLE 1-continued

| Ex. | $R^1$ | $R^2$ | $R^3$ | $R^4$ | $R^5$ | $R^6$ | M |
|---|---|---|---|---|---|---|---|
| 21 | 3-$SO_3M$ | H | 2-$OCH_3$ | H | —NH—(3,5-di-$CO_2M$-phenyl) | —S—$CH_2CH_2CH_2SO_3M$ | Li |
| 22 | 3-$SO_3M$ | H | 2-$OCH_3$ | H | —NH—(3-$CO_2M$-phenyl) | —S—$CH_2CH_2SO_3M$ | Li |
| 23 | 3-$SO_3M$ | H | 2-$OCH_3$ | H | —NH—(2-$CH_3$-5-$SO_3M$-phenyl) | —NH—$CH_2CH_2SO_3M$ | Na |
| 24 | 3-$SO_3M$ | H | 2-$OCH_3$ | H | —NH—(4-$SO_3M$-phenyl) | —S—$CH(CH_3)$—$CO_2M$ | Na |
| 25 | 4-$SO_3M$ | H | 3-$CH_3$ | H | —S—CH($CH_2CO_2M$)($CH_2CO_2M$) | —S—CH($CH_2CO_2M$)($CH_2CO_2M$) | Li |
| 26 | 4-$SO_3M$ | H | 2-$CH_3$ | H | —NH—(3,5-di-$CO_2M$-phenyl) | —NH—(3,5-di-$CO_2H$-phenyl) | $HN(CH_2CH_2OH)_3$ |
| 27 | 5-$SO_3M$ | 2-$CH_3$ | 2-$OCH_3$ | 5-$CH_3$ | —NH—(3-$SO_3M$-phenyl) | —NH—(3-$SO_3M$-phenyl) | Na |
| 28 | 3-$SO_3M$ | H | 2-$OCH_2CH_3$ | H | —NH—(3,5-di-$CO_2M$-phenyl) | —NH—(3,5-di-$CO_2H$-phenyl) | Li |

TABLE 1-continued

| Ex. | R¹ | R² | R³ | R⁴ | R⁵ | R⁶ | M |
|---|---|---|---|---|---|---|---|
| 29 | 4-SO₃M | H | 2-OCH₃ | 5-OCH₃ | MO₂C-CH(NH-)-CH₂-CH₂-CO₂M | HO₂C-CH(NH-)-CH₂-CH₂-CO₂H | Na |
| 30 | 3-CO₂M | 5-CO₂M | 2-OCH₃ | H | -N(H)-CH₂-CH₂-SO₃H | -N(H)-CH₂-CH₂-SO₃H | Na |
| 31 | 3-SO₃M | H | 3-CH₃ | H | -N(H)-CH₂-CH₂-SO₃H | -N(H)-CH₂-CH₂-SO₃H | Li |

In addition to the dyes described herein, the present invention comprises ink formulations which employ the novel dyes. Ink formulations generally comprise a colorant and a carrier as well as optional additives as enumerated above. Some examples of ink formulations are shown below, as well as test results for the specified inks.

The inks of the present invention can be prepared in customary manner by mixing the individual constituents together, for example, in the desired amount of water. These inks are especially suitable as the yellow component for multicolor printing.

Example 32

To a sample of the dye of Formula (III) (5% based on total weight), 0.1% sodium EDTA was added, followed by stirring for 10 minutes. Tetraethylene glycol (8% based on total weight) was then added and stirring continued for 20 minutes. 1,2-Hexanediol (7% based on total weight) was added followed by stirring for 20 minutes. Proxel® GXL biocide (0.2% based on total weight) was then added and stirring continued for an additional 20 minutes. Sodium phosphate (0.5% based on total weight) and sodium borate (0.5% based on total weight) were added and stirring continued for 40 minutes. The pH was adjusted to 8.5 with either acetic acid or sodium hydroxide and filtered through a 0.22µ filter unit. The balance of the formulation was deionized water. The ink was filled in heads and tested on ExecJet IIc machines (idle test after 5, 10, 15 and 20 minutes) as described below.

Example 33

To a sample of the dye of Formula (IV) (5% based on total weight), 0.1% sodium EDTA was added, followed by stirring for 10 minutes. Tetraethylene glycol (8% based on total weight) was then added and stirring continued for 20 minutes. 1,2-Hexanediol (7% based on total weight) was added followed by stirring for 20 minutes. Proxel® GXL biocide (0.2% based on total weight) was then added and stirring continued for an additional 20 minutes. Sodium phosphate (0.5% based on total weight) and sodium borate (0.5% based on total weight) was added and stirring continued for 40 minutes. The pH was adjusted to 8.5 with either acetic acid or sodium hydroxide and filtered through a 0.22µ filter unit. The balance of the formulation was deionized water. The ink was filled in heads and tested on ExecJet IIc machines (idle test after 5, 10, 15 and 20 minutes) as described below.

Example 34

To a sample of the dye of Formula (V) (5% based on total weight), 0.1% sodium EDTA was added, followed by stirring for 10 minutes. Tetraethylene glycol (8% based on total weight) was then added and stirring continued for 20 minutes. 1,2-Hexanediol (7% based on total weight) was added followed by stirring for 20 minutes. Proxel® GXL biocide (0.2% based on total weight) was then added and stirring continued for an additional 20 minutes. Sodium phosphate (0.5% based on total weight) and sodium borate (0.5% based on total weight) was added and stirring continued for 40 minutes. The pH was adjusted to 8.5 with either acetic acid or sodium hydroxide and filtered through a 0.22µ filter unit. The balance of the formulation was deionized water. The ink was filled in heads and tested on ExecJet IIc machines (idle test after 5, 10, 15 and 20 minutes) as described below.

Test Results for Examples 32–34

The idle test results are summarized below, showing the % probability that the head would fail with the following dyes:

| Idle Time (minutes) | Project Yellow 1G* | Example 32 | Example 33 | Example 34 |
|---|---|---|---|---|
| 5 | 83% | 11% | 44% | 55% |
| 10 | 88% | 11% | 56% | 8% |
| 15 | 88% | 22% | 78% | 0% |
| 20 | 88% | 33% | 78% | 8% |
| Average | 87% | 19% | 64% | 18% |
| No. of Heads Tested | 8 | 3 | 3 | 4 |

*Project Yellow IG is a commercially available yellow dye used as a standard for the purposes of this test.

The foregoing is considered as illustrative only of the principles of the present invention. Since numerous modifications and changes will readily occur to those skilled in the art, the foregoing is not intended to limit the invention to the exact construction and operation shown and described, and all suitable modifications and equivalents falling within the scope of the appended claims are deemed within the present inventive concept.

The features of the present invention, together with the other objectives of the invention, and along with the various features of novelty which characterize the invention, are pointed out with particularity in the claims annexed to and forming a part of this disclosure.

What is claimed is:

1. A compound of the formula

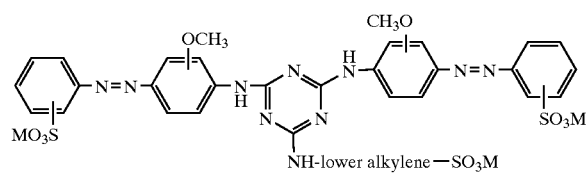

wherein M comprises —H, —Li, —Na, —K, —N(R$^1$)$_4$, or —HN(R$^1$)$_3$,
wherein R$^1$ comprises —H, -lower alkyl, or —(CH$_2$CHR$^2$—O)—H, and R$^2$ comprises —H, —CH$_3$, —CH$_2$CH$_3$, or —CH$_2$OH.

2. The compound of claim 1 having the formula

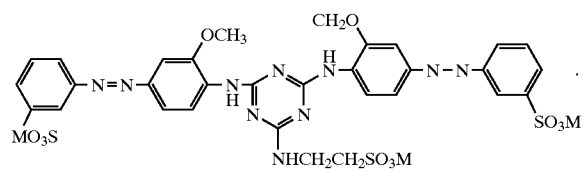

3. An ink composition comprising
a) at least 0.1% by weight of a compound of claim 1,
b) water, and
c) at least one co-solvent.

4. An ink composition comprising
d) at least 0.1% by weight of a compound of claim 2,
e) water, and
f) at least one co-solvent.

5. A substrate or medium coated with the ink composition of claim 3.

6. A substrate or medium coated with the ink composition of claim 4.

7. The medium of claim 5 wherein said medium is selected from paper, projector slides and textile materials.

8. The medium of claim 6 wherein said medium is selected from paper, projector slides and textile materials.

9. A compound of the formula

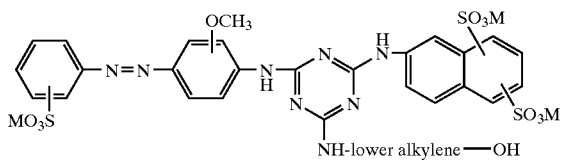

wherein M comprises —H, —Li, —Na, —K, —N(R$^1$)$_4$, or —HN(R$^1$)$_3$,
wherein R$^1$ comprises —H, -lower alkyl, or —(CH$_2$CHR$^2$—O)—H, and R$^2$ comprises —H, —CH$_3$, —CH$_2$CH$_3$, or —CH$_2$OH.

10. The compound of claim 9 having the formula

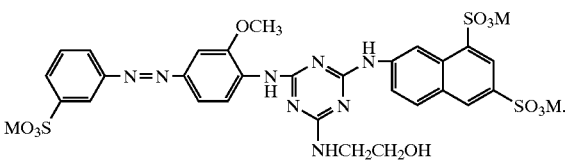

11. An ink composition comprising
g) at least 0.1% by weight of a compound of claim 9,
h) water, and
i) at least one co-solvent.

12. An ink composition comprising
j) at least 0.1% by weight of a compound of claim 10
k) water, and
l) at least one co-solvent.

13. A substrate or medium coated with the ink composition of claim 11.

14. A substrate or medium coated with the ink composition of claim 12.

15. The medium of claim 13 wherein said medium is selected from paper, projector slides and textile materials.

16. The medium of claim 14 wherein said medium is selected from paper, projector slides and textile materials.

* * * * *